United States Patent
Hall, III

(10) Patent No.: US 6,179,107 B1
(45) Date of Patent: Jan. 30, 2001

(54) TRIM VALVE FOR A FLUID OPERATED FRICTION TORQUE TRANSMITTING DEVICE

(75) Inventor: Arthur Hall, III, Cicero, IN (US)

(73) Assignee: General Motors Corporation, Detroit, MI (US)

( * ) Notice: Under 35 U.S.C. 154(b), the term of this patent shall be extended for 0 days.

(21) Appl. No.: 09/435,673

(22) Filed: Nov. 8, 1999

(51) Int. Cl.$^7$ ............................................. F15B 13/043

(52) U.S. Cl. ................. 192/109 F; 91/433; 137/596.16; 137/625.64

(58) Field of Search .......................... 91/433; 137/596.16, 137/625.64; 192/109 F

(56) References Cited

U.S. PATENT DOCUMENTS 5,908,098 * 6/1999 Gorman et al. ............. 137/625.64 X

* cited by examiner

Primary Examiner—Gerald A. Michalsky
(74) Attorney, Agent, or Firm—Laura C. Hargitt

(57) ABSTRACT

A trim valve controls the pressure rise and pressure gain in a torque transmitter. The trim valve controls the distribution of a system pressure to the torque transmitter in a controlled manner such that the apply pressure of the torque transmitter has a desired gain rate. A spool valve controls the admission of system pressure through a sleeve valve for distribution to the torque transmitter in response to a control pressure. The trim valve has bias spring elements that control a sleeve member of the trim valve in response to the apply pressure at the torque transmitter. The rate at which the apply pressure rises in relation to the control pressure is established by the bias spring elements which can be a single variable rate member or a plurality of parallel members. If parallel members are used, they are positioned to be sequentially engaged by the sleeve valve during linear movement in response to a change in the apply pressure.

6 Claims, 4 Drawing Sheets

TRIM VALVE FOR A FLUID OPERATED FRICTION TORQUE TRANSMITTING DEVICE

TECHNICAL FIELD

This invention relates to controls for selectively engageable, fluid operated friction torque transmitting assemblies and more particularly to such controls for establishing the pressure rise during engagement of the torque transmitting assembly.

BACKGROUND OF THE INVENTION

Automatic shifting transmissions use fluid operated friction torque transmitting assemblies, such as clutches and brakes, to control the speed ratio between the transmission input shaft and the transmission output shaft. The speed ratio is changed by interchanging at least one of the torque transmitting assemblies for another of the torque transmitting assemblies. It is common practice to control the pressure rise in the oncoming torque transmitting assembly with a trim valve.

The trim is generally a downstream regulator valve having a variable bias pressure imposed thereon. The bias pressure is, with the advent of electronic controls, established by a variable bleed solenoid valve. The solenoid valve has an output pressure that varies in accordance with a control voltage. An electronic device, such as a preprogrammed digital computer, establishes the desired voltage input to the solenoid valve. The output from the solenoid is a variable hydraulic bias pressure that is proportional to the voltage. The output pressure of the trim valve is proportional to the variable hydraulic pressure. The feed pressure to the trim valve is generally main control pressure which is much greater than the maximum variable hydraulic bias pressure.

The hydraulic bias pressure at the trim valve has a range of zero to approximately 70 psi. The trim valve output pressure is required to have a range of approximately zero to approximately 250 psi depending on the torque capacity required by the oncoming torque transmitting assembly. The trim valve therefore has an overall gain of approximately 3.5 which is determined by dividing the maximum output pressure by the maximum bias pressure. As can be appreciated from the above gain value, every 1.0 psi change of the bias pressure results in approximately a 3.5 psi change in the output pressure.

Since the presently available trim valves use a linear gain valve, it is extremely difficult to provide a smooth ratio interchange when it is necessary to control the oncoming torque transmitting assembly to be fully engaged at a trim valve output pressure of 50 psi or less. This means that the bias pressure is approximately 14.3 psi which is established in the lower 21 percent (%) of the output range of the solenoid valve. Accurate pressure control under these conditions requires either a very close tolerance on the valve members or extremely accurate electronic control and feedback or both resulting in higher manufacturing and inspection costs.

SUMMARY OF THE INVENTION

It is an object of the present invention to provide an improved trim valve mechanism for controlling the pressure rise in an oncoming fluid operated friction torque transmitting mechanism (clutch or brake).

In one aspect of the present invention, a trim valve for controlling the engagement pressure of a fluid operated friction torque transmitting mechanism incorporates a spool valve member and a sleeve valve member, which are biased by spring members, and a variable control pressure source, having a range of output pressure, to provide a low gain during a first portion of the range of the pressure source and a high gain during a second portion of the range of the pressure source.

In another aspect of the present invention, one of the bias springs is a variable rate spring providing a low gain when the variable pressure is low and high gain when the variable pressure is high. In yet another aspect of the present invention, the gain is continuously variable for the entire useful range of the control pressure.

In still another aspect of the present invention, the sleeve valve has two bias springs imposing a force thereon during a portion of the stroke of the sleeve valve. In a further aspect of the present invention, a stroke limiting surface is employed to limit the stroke of the sleeve valve such that the engagement pressure is set at a maximum system value after the stroke is limited.

In one embodiment of the present invention, a trim valve has a sleeve valve slidably disposed in a valve body and a spool valve slidably disposed in the sleeve valve. The sleeve valve has an inlet port, communicating with an inlet annulus in the valve body, an outlet port, communicating with an outlet annulus in the valve body and an exhaust port, communicating with an exhaust annulus in the valve body. The valve spool has a pair of spaced lands forming spaced control surfaces that permit controlled fluid flow from the inlet port to the outlet port when a pressure increase at the outlet port is requested, and permit controlled fluid flow from the outlet port to the exhaust port when a pressure decrease is requested.

The outlet annulus of the valve body is communicated with a selectively engageable, fluid operated, multi-plate friction torque transmitting mechanism. The trim valve is controlled to establish the proper pressure at the friction torque transmitting mechanism during the engagement thereof.

The pressure request is issued by a solenoid valve in the form of a control pressure acting on one end of the spool valve. The control pressure is counteracted by a spring force at the other end of the spool valve. The sleeve valve has one end thereof subjected to the pressure at the outlet port and the other end subjected to a bias force generated by a variable rate spring. Thus as the spool valve admits increased pressure to the outlet port, the sleeve valve reacts to the pressure change at the outlet port by closing the communication at a varying rate depending on the spring rate in the bias force generated by the variable rate spring.

The sleeve valve continually moves to new linear positions in the valve body as the outlet pressure is changing. When the outlet pressure is increases to a predetermined value, the sleeve valve abuts a stop which prevents further linear travel and the outlet pressure is raised to a maximum value unrestricted by the sleeve valve.

In another embodiment of the present invention, the sleeve valve has an inner bias spring that imposed a force thereon during the entire linear movement and an outer bias spring that is engaged by the sleeve valve after a predetermined linear movement less than the entire available linear movement. When the sleeve valve is biased by the inner spring only, a first gain rate between the inlet pressure and the outlet pressure is present; and when the sleeve valve is biased by both the inner and outer springs, a second gain rate between the inlet and outlet pressures is present. As with the first embodiment, a stop surface can be incorporated to limit the linear movement of the sleeve valve thereby permitting the outlet pressure to rise to the maximum value set by the inlet pressure.

Both of the embodiments will provide a lower gain for the outlet pressure of the trim valve. This permits more accurate and consistent pressure control during operation of the torque transmitting device when low engagement pressures are required. The trim valves will, however, produce full engagement pressure at the torque transmitting device, thus retaining the overall gain available with the trim valves currently in use.

DESCRIPTION OF AN EXEMPLARY EMBODIMENT

Figure 1:
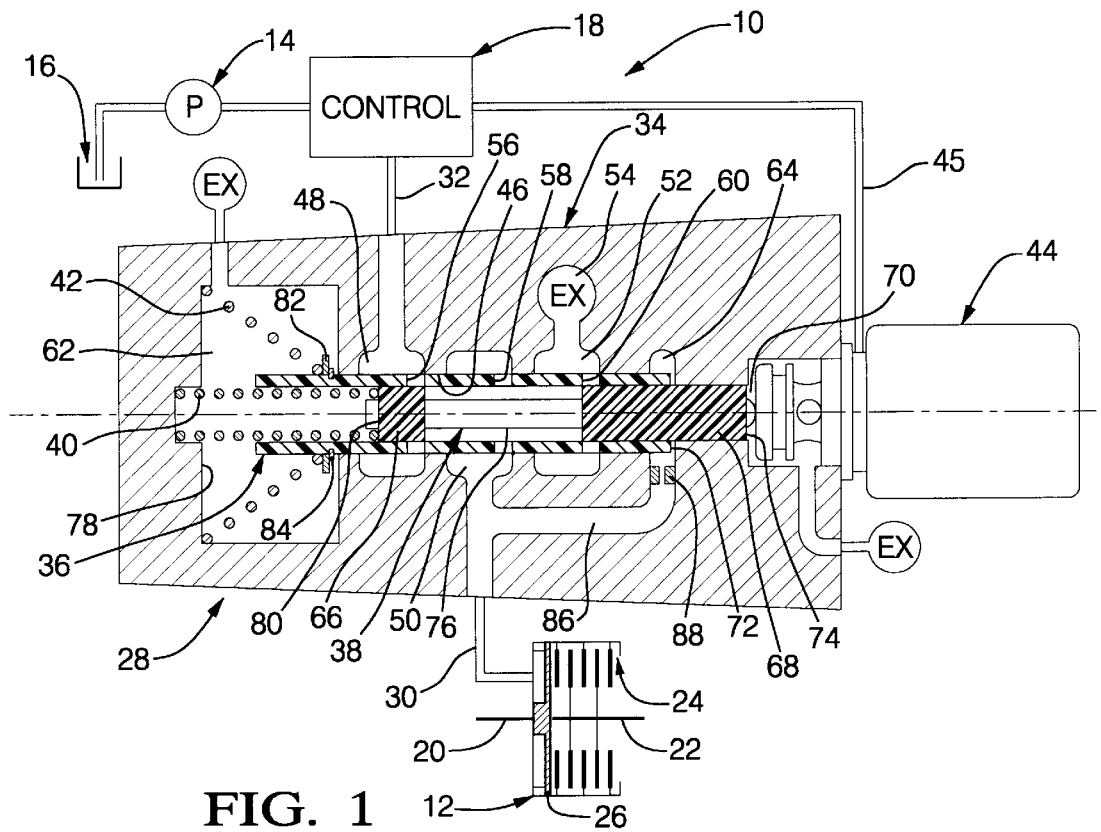
FIG. 1 is a diagrammatic representation of one embodiment of a trim valve incorporating the present invention with the trim valve in the unactuated position.
Figure 2:
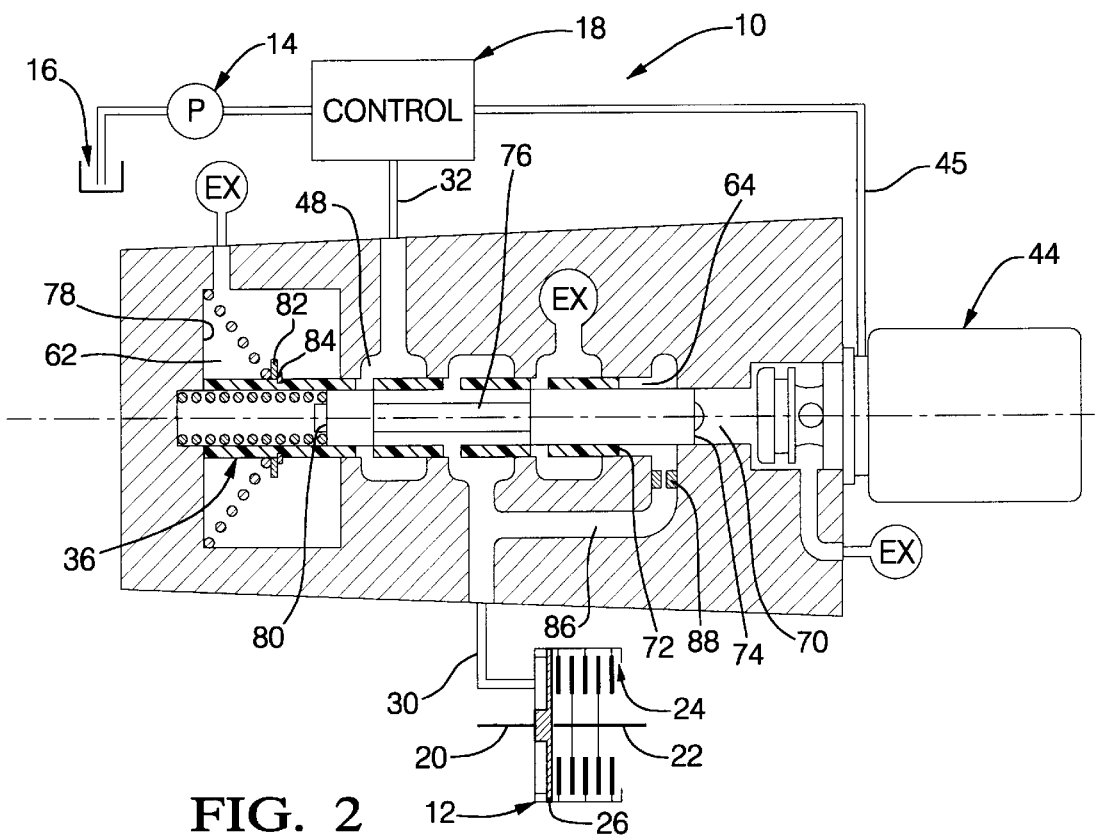
FIG. 2 is a diagrammatic view of the trim valve shown in FIG. 1 displaced to the fully actuated position.

Referring to the drawings wherein the same characters represent the same or corresponding parts throughout the several views, there is seen in FIGS. 1 and 2 a portion of a control system 10 for a conventional selectively engageable friction torque transmitting device 12. The torque transmitting device 12 may be either a clutch or a brake. The control system 10 includes a pump 14 which draws hydraulic fluid from a reservoir 16 for delivery to an electro-hydraulic control mechanism 18. The control mechanism 18 includes a preprogrammed digital computer and a plurality of conventional hydraulic valves for establishing various system pressure levels and for directing hydraulic fluid during the operation of a multi-ratio power transmission, not shown, which includes the torque transmitting device 12.

Those skilled in the art will understand that the torque transmitting device 12 is utilized to maintain at least one of the ratios in the transmission. The torque transmitting device 12 must undergo controlled engagement during the interchange of ratios to accomplish a smooth and acceptable shift in the transmission. The torque transmitting device includes an input side 20 and an output side 22. A plurality of friction discs 24 are disposed between the input 20 and the output 22.

The discs 24 are alternately splined to the input side 20 and the output side 22 and are urged into engagement by a fluid operated piston 26. When the piston 26 is not pressurized, a conventional return spring assembly, not shown, urges the piston axially away from the friction discs 24. The return spring assembly establishes a minimum hydraulic pressure that must be applied to the piston 26 prior to the piston 26 moving axially into engagement with the friction discs 24.

Hydraulic fluid is supplied to and exhausted from the torque transmitting device 12 by a trim valve 28 through a passage 30. Fluid is supplied to the trim valve 28 through a passage 32 in the control 18. The hydraulic fluid in the passage 32 is preferably at the pressure level of the system or main pressure in the control 18. The trim valve 28 includes a valve body 34, which may be part of the control 18, a sleeve valve 36, a spool valve 38, bias springs 40 and 42 and a solenoid control valve 44. The solenoid control valve 44 is a conventional mechanism that outputs a pressure proportional to an electrical signal, such as voltage, from the digital computer or an electronic control unit in the control 18. The solenoid valve 44 receives pressurized fluid from the control 18 through a passage 45. The pressure in the passage 45 is generally at a level reduced from the maximum system pressure.

The valve body 34 has a bore 46 which communicates with an inlet annulus 48, an outlet annulus 50 and an exhaust annulus 52. The inlet annulus 48 communicates with the passage 32, the outlet annulus 50 communicates with the passage 30 and the exhaust annulus 52 communicates with an exhaust passage 54 that may communicate directly with the reservoir 16. The sleeve valve 36 is slidably disposed in the bore 46. Spaced inlet, outlet and exhaust ports 56, 58 and 60 are formed in the sleeve valve 36.

The inlet port 56, the outlet port 58 and the exhaust port 60 are accurately machined openings in the sleeve valve 36. These openings and the spacing thereof can be very accurately positioned on the sleeve valve 36 using currently available machine tools. The inlet, outlet, and exhaust annuli 48, 50 and 52 can be cast into the valve body 34 using conventional casting processes which are currently used to manufacture such components. The need to accurately place or machine the limits of each of the annuli is eliminated by the manufacturing process of the sleeve valve 36. It is merely sufficient that the annuli 48, 50 and 52 have sufficient axial length to encompass the linear movement range of the sleeve valve 36. Thus close tolerances are not required for these elements.

The sleeve valve 36 cooperates with the bore 46 to form a spring pocket or chamber 62 and a pressure feedback chamber 64. The spool valve 38 has spaced valve lands 66 and 68 which are slidably disposed in the sleeve valve 36. The land 68 is also slidably disposed in the bore 46 and cooperates therewith to form a pressure control chamber 70 that is closed at one side by the solenoid valve 44. The outer diameter of the spool valve 38 defines the inner diameter of the chamber 64 such that only the annular end 72 of the sleeve valve 36 will be affected by hydraulic fluid pressure in the chamber 64. The circular end 74 of the spool valve 38 is subject to fluid pressure in the chamber 70. The spool valve 38 is manufactured by commercial processes which permit the lands 66 and 68 to be accurately located along the length of the spool valve 38. Thus a space or valley 76 between the lands 66 and 68 is held within close tolerances.

The spring 40 is positioned between one end 78 of the spring chamber 62 and the end 80 of the spool valve 38 to urge the spool valve 38 toward the chamber 70. Fluid pressure in the chamber, as provided by the solenoid valve 44 will urge the spool valve 38 leftward, as viewed in FIGS. 1 and 2, within the sleeve valve 36. The spring 42 is positioned between the end 78 and a spring seat 82 located on the sleeve valve 36 by a locking ring 84. The spring 42 is a conventional variable rate spring, that is as the spring 42 is compressed, the spring rate increases.

The sleeve valve 36 is urged toward the chamber 64 by the spring 42. Fluid pressure in the chamber 64 will urge the sleeve valve 36 leftward, as viewed in FIGS. 1 and 2, against the force in the spring 42. Fluid pressure in the chamber 64 is supplied through a feedback passage 86 that communicates with the outlet annulus 50. This pressure is equal to the pressure at the torque transmitting device 12. An orifice or restriction 88 is placed in the passage 86 to dampen any hydraulic vibrations in the control system. The sleeve valve 36 moves linearly relative to the spool valve 38 in response to pressure changes in the chamber 64. In FIG. 2, it should be noted that the sleeve valve 36 is in abutment with the end 78 of the spring chamber 62.

Figure 3:
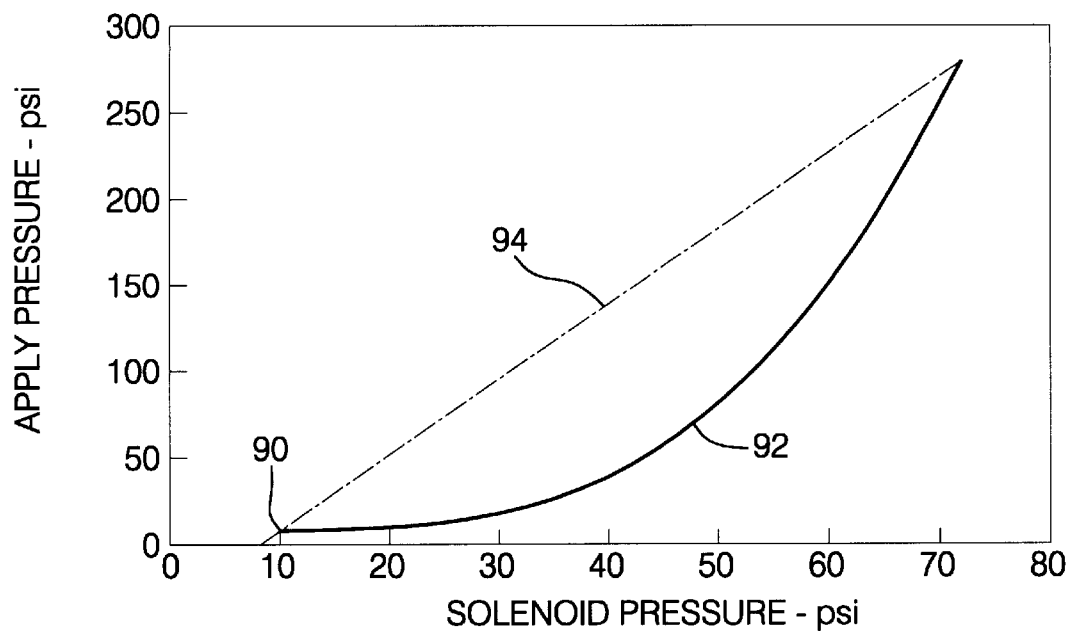
FIG. 3 is a performance curve for the trim valve depicted in FIGS. 1 and 2 describing the outlet pressure as a function of control pressure resulting from a first variable rate bias spring.
Figure 4:
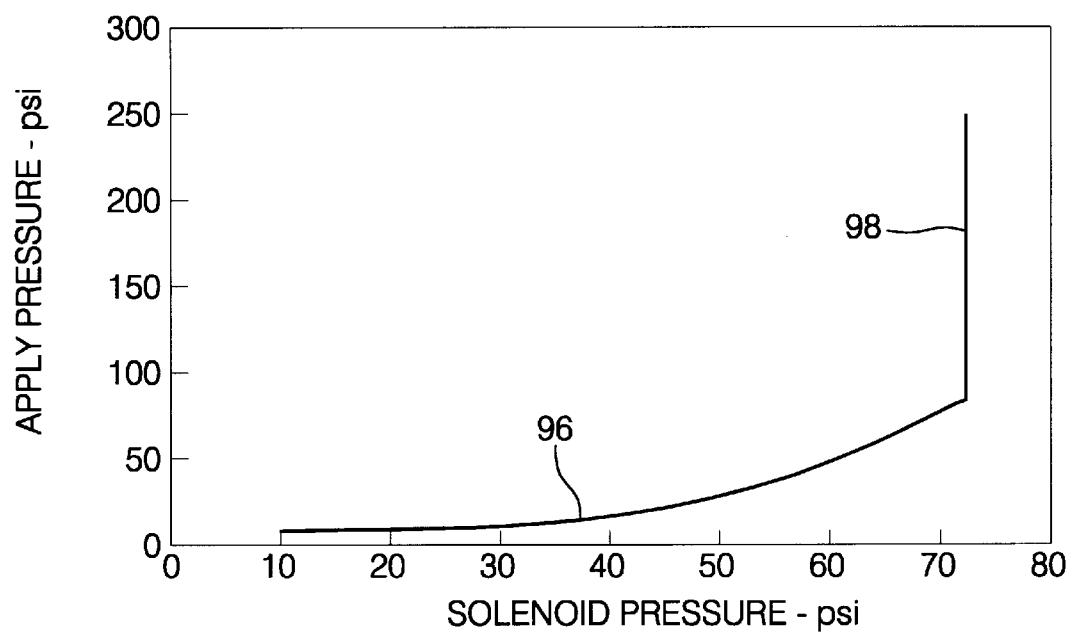
FIG. 4 is a performance curve for the trim valve depicted in FIGS. 1 and 2 describing the outlet pressure as a function of control pressure resulting from another variable rate bias spring.

The operating characteristics described in FIGS. 3 & 4 show the solenoid control pressure increasing in the chamber 70 to approximately 10 psi before any apply pressure is established. This is due to the preload on the spring 40. Once the preload on the spring 40 is overcome, the spool valve 38 will move leftward in the sleeve valve 36 thereby admitting fluid through the port 56 to the port 58 such that the apply pressure in passage 30 as well as the pressure in the chamber 64 will rise until the preload on the spring 42 is overcome at point 90. The sleeve valve 36 will respond to the pressure in the chamber 64 to move the sleeve valve 36 leftward relative to the spool valve 38 thereby closing the port 56 at the edge of the land 66. If the control pressure in the chamber 70 decreases, the spool valve 38 moves rightward under the influence of the spring 40 and the edge of the land 68 will open the exhaust port 60 thereby reducing the pressure in the passage 30 and the chamber 64. The sleeve valve 36 will move rightward under the influence of the spring 42 until the exhaust port 60 is again closed or the torque transmitter 12 is fully disengaged.

Further increases in the control pressure provided by the solenoid valve 44 to the chamber 70 will result in increased apply pressure at the torque transmitting device 12. The apply pressure will increase at the variable rate represented by the line 92. For each incremental increase in the solenoid control pressure in the chamber 70 the corresponding apply pressure incremental increases will be larger. This is considerably different than the apply pressure versus control pressure that is provided by the prior art trim valves as represented by the chainline 94.

The present invention permits accurate control of the apply pressure at the torque transmitting device 12 between the fill pressure (approximately 10 psi) and 50 psi by utilizing approximately one half of the solenoid pressure range during this period. This results in extremely fine engagement control of the torque transmitter 12 during low input torque conditions that an operator is likely to have at part throttle or closed throttle coasting upshifts. Two events might occur when the maximum system pressure is reached at the apply passage 30; first, the sleeve valve 36 can abut the end 78 and prevent further regulation or second, the maximum control pressure produced at the solenoid valve 44 is reached also preventing further regulation.

In some transmission systems it is desirable to limit the pressure regulation to a value less than the maximum system pressure since full engagement is reached prior to this event.

The present invention permits the variation of control as seen in the operating curve of FIG. 4. In this situation, the rate of change in the variable rate spring 42 is designed at a lower value. Thus the apply pressure will increase along the line 96 in FIG. 4 until the sleeve valve 36 abuts the end 78 at which point the trim valve 28 will discontinue regulation and the apply pressure will rapidly rise to the maximum system pressure along the line 98. Since at this point the torque transmitter is fully engaged, the rapid rise in pressure will not be noticed by the operator.

Those skilled in the art will immediately recognize variations that can be attained with this system. For example, the sleeve valve can be shortened to prevent abutment thereby permitting continued regulation of the apply pressure for the full range of control pressure; the spool valve can be provided with a stop pin internally of the spring 40 to limit the linear movement such that the sleeve valve will regulate the apply pressure of the torque transmitter 12 at a predetermined pressure. It should be noted that this occurs because the sleeve valve is the controlling element. Once the spool valve can no longer move linearly and the control pressure is not decreased, the inlet port is closed and the exhaust port is opened by any increase in apply pressure; and the exhaust port is closed and the and the inlet port is opened by any decrease in apply pressure. This has no effect during the exhausting of the torque transmitter since any decrease in the control pressure will generally result in a decrease in the apply pressure. If desired, the trim valve 28 can also control the exhausting of the torque transmitter by simply controlling the control pressure during the disengagement cycle.

Figure 5:
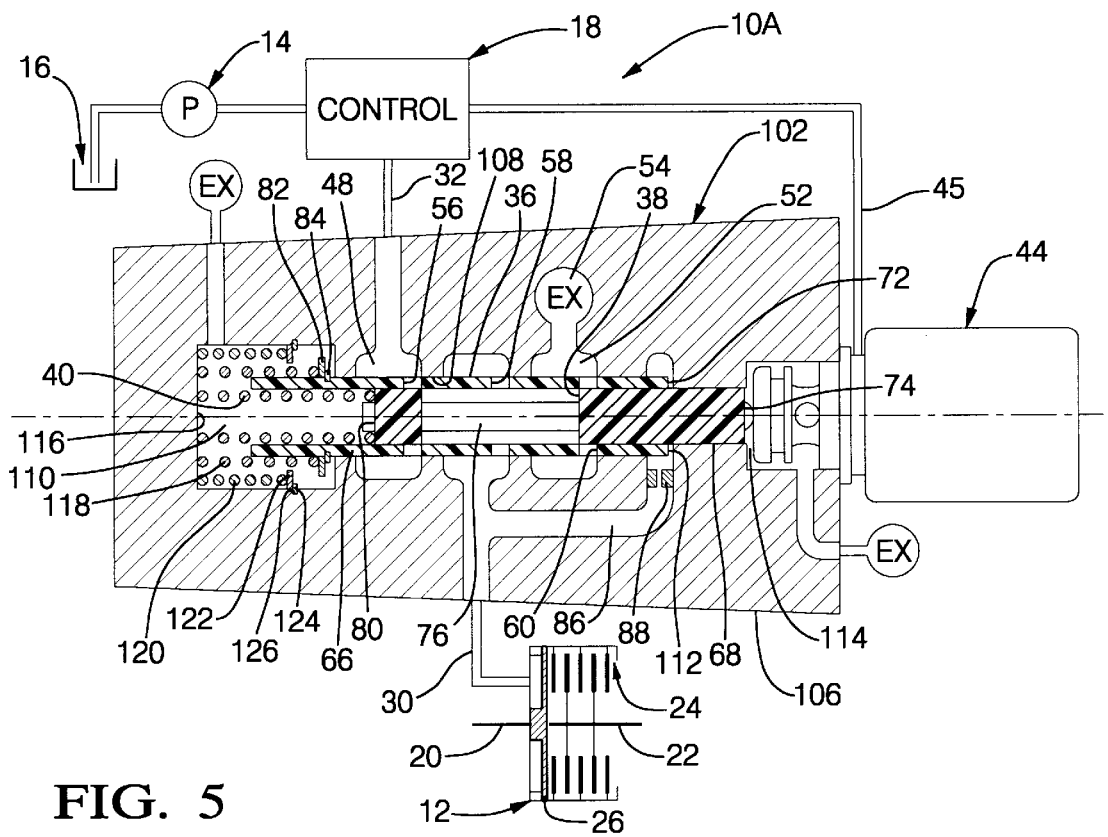
FIG. 5 is a diagrammatic view, similar to FIG. 1, of an alternative embodiment of a trim valve incorporating the present invention.
Figure 6:
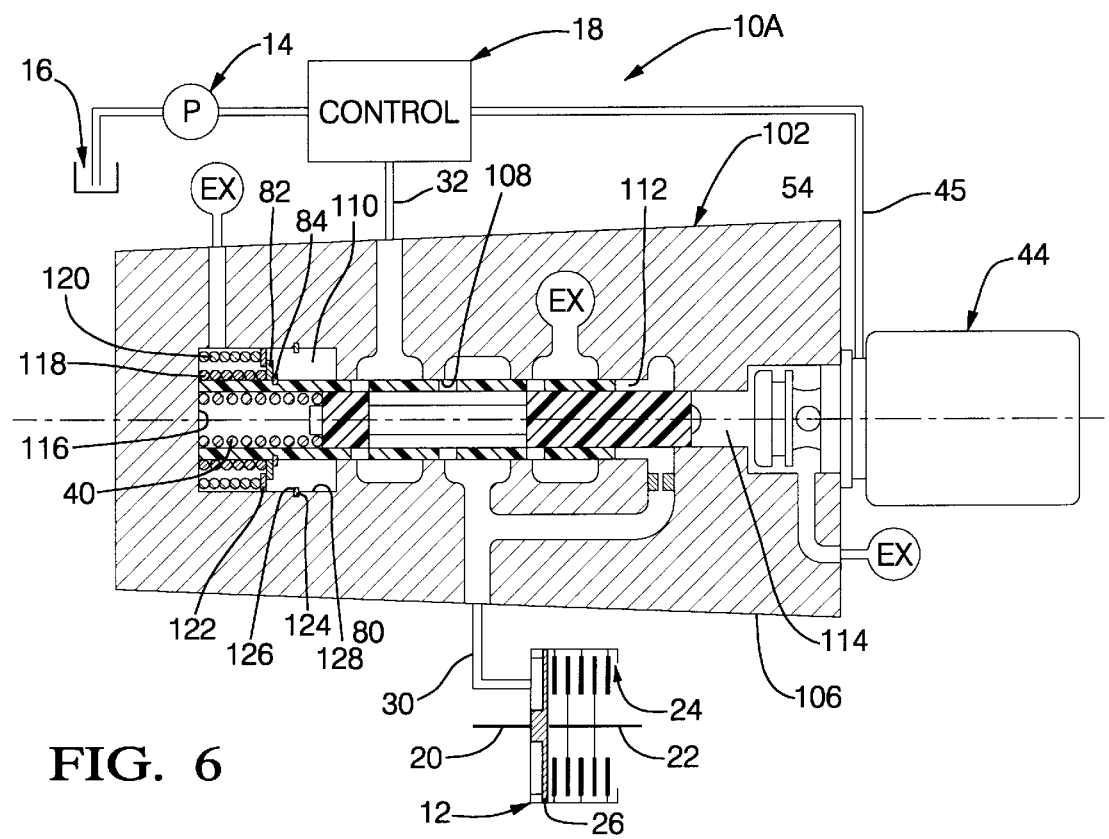
FIG. 6 is a diagrammatic view, similar to FIG. 2, of the trim valve embodiment shown in FIG. 5.

An alternative embodiment of the present invention is shown in the control system 10A which is depicted in FIGS. 5 and 6. In this embodiment, a trim valve 102 controls fluid flow to the torque transmitter 12. The trim valve 102 includes a valve body 106 having a bore 108, a spring chamber 110, a feedback chamber 112 and a control chamber 114. The sleeve valve 36 is slidably disposed in the bore 108 and the spool valve 38 is slidably disposed in the spool valve 36. The control chamber 114 is closed by the end 74 of the spool valve 38 and the solenoid valve 44. As with the valve 28, the trim valve 102 receives control pressure signals from the solenoid valve 44. The bias spring 40, disposed in the spring chamber 110, is compressed between an end 116 of the spring chamber 110 and the end 80 of the spool valve 38 to counteract the control pressure in the chamber 114.

The feedback chamber 112 is formed by the annular end 72 of the sleeve valve 36 and the spool valve 38. The feedback chamber 112 is in fluid communication with the outlet annulus 50 of the valve body 102 through the passage 86 and the orifice 88. The pressure in the feedback chamber urges the sleeve valve 36 leftward, as seen in FIGS. 5 and 6, against the force in a pair of bias springs 118 and 120. The bias spring 118 is compressed between the spring seat 82 and the end 116. The bias spring 120 is compressed between a spring seat 122 and the end 116. The spring seat 122 is positioned in the spring chamber 110 by a locking ring 124 secured in a groove 126 formed in a cylindrical wall 128 of the spring chamber 110.

Figure 7:
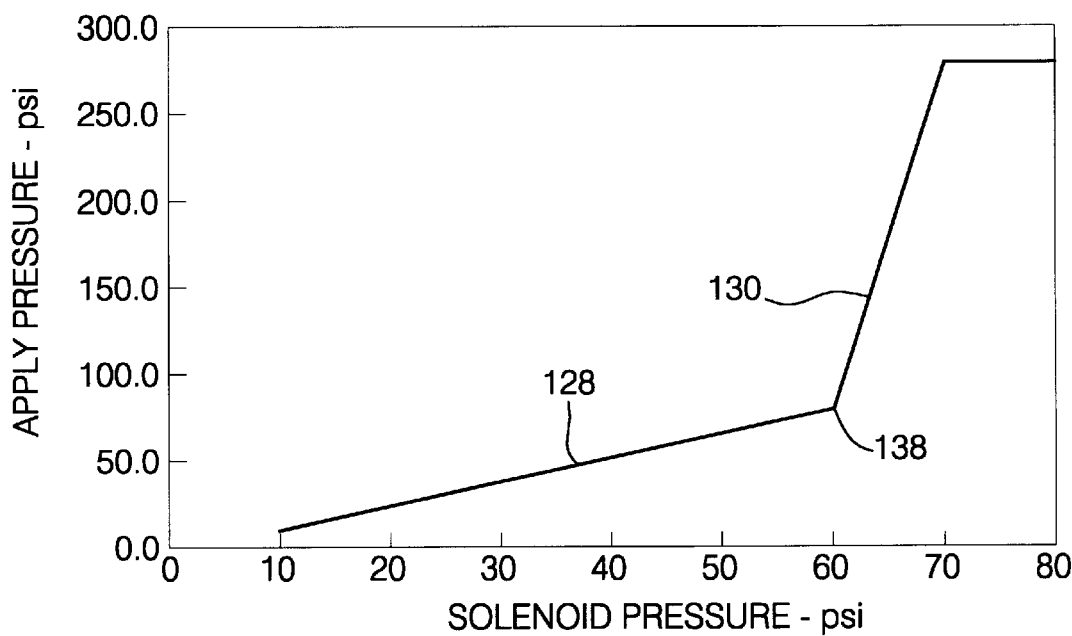
FIG. 7 is a performance curve for the trim valve depicted in FIGS. 5 and 6 describing the outlet pressure as a function of control pressure resulting from a first two bias springs reacting on the sleeve valve of the trim valve.

As with the trim valve 28, the solenoid valve 44 supplies pressure to the control chamber 114 as commanded by the control 18. As the pressure in the control chamber increases, the spool valve 38 is urged leftward, as seen in FIGS. 5 and 6, against the bias spring 40. As seen in FIG. 7, the valve spool 38 will overcome the preload of the bias spring 40 at approximately 10 psi and the pressure at the torque transmitter 12 will rise to approximately 10 psi.

The pressure at the torque transmitter is established, during a primary phase represented by a line 128 in FIG. 7, by the bias spring 118. It should be noted that the bias spring 120 has no effect on the initial response and the first phase of the sleeve valve 36 as it is maintained at a spaced relation thereto by the locking ring 124 and the spring seat 122. When the control pressure in the chamber 114 has reached approximately 60 psi, the spring seat 82 will abut the spring seat 122 such that both bias springs 118 and 120 will impose a bias force on the spool valve 36. This will begin the second phase of operation of the trim valve 102 as represented by the line 130 in FIG. 7. The second phase 130 has a much steeper slope than the first phase 128 thereby providing increased gain for the trim valve 102. However the trim valve 102 provides the same overall gain, that is 3.5 to 1, as the trim valve 28. When the control pressure in the chamber 114 reaches the maximum allowable value or the sleeve valve 36 abuts the end 116, the pressure at the torque transmitter will be equal to the system pressure, however the torque transmitter will have achieved maximum torque capacity at a much lower pressure.

Figure 8:
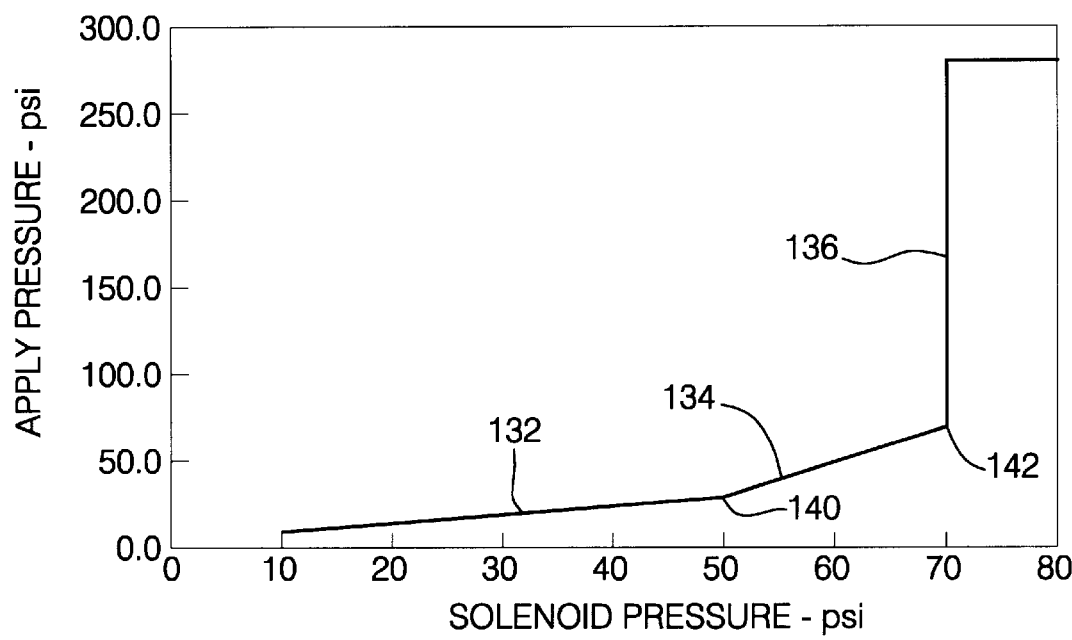
FIG. 8 is a performance curve for the trim valve depicted in FIGS. 5 and 6 describing the outlet pressure as a function of control pressure resulting from a second two bias springs reacting on the sleeve valve of the trim valve.

The performance curve shown in FIG. 8 is for a modification of the trim valve performance shown in FIG. 7. For the performance shown in FIG. 8, the spring rate of the bias spring 118 has been decreased, resulting in a lower gain during the primary phase, represented by the line 132, of the trim valve 102. Also for this modification, the secondary phase, represented by the line 134, begins at a lower control pressure and has a lower gain rate than that shown at line 130 in FIG. 7. In the modification described at FIG. 8, the sleeve valve 36 abuts the end 116 prior to the maximum system pressure being delivered to the torque transmitter 12 as represented by the substantially vertical line 136 in FIG. 8. Those skilled in the art will recognize that one or both of the springs 118 and 120 can be designed as variable rate spring thereby further increasing the flexibility of the possible performance that can be designed into the trim valve 102.

The performance curve in FIG. 7 has one knee at point 138 while the performance curve in FIG. 8 has two knees at points 140 and 142. The knee 138 and the knee 140 are determined by the point at which the spring seat 82 contacts the spring seat 122. The knee 142 is determined by the point at which the sleeve valve 36 abuts the end 116. The knee 138 and the knee 140 can be made, by design, to occur at different control pressures by changing the rate of the spring 118 or the position of the locking ring 124 in the cylindrical wall 128.

The knee 142 can be made, by design, to occur at different control pressures by changing the length of the sleeve valve 36. It should be evident to those skilled in the art that the knee 142 should occur only after the torque transmitter has reached the maximum torque capacity. It should be appreciated that the knee 142 can be eliminated by increasing the rate of the spring 120 and/or significantly decreasing the length of the sleeve valve 36. It should be apparent to those skilled in the art that this modification, FIG. 5, provides much leeway during the design of the operation of the trim valve 28 such that the apply pressure of the torque transmitter 12 is accurately controlled during periods of transmission operation when low engagement pressures are requested. As described above for the trim valve 28, the spool valve 38 can be designed to abut a stop such that the sleeve valve will regulate the apply pressure at the torque transmitter 12.

What is claimed is:

1. A trim valve in a fluid control system for controlling the apply pressure to a torque transmitter, said fluid control system having means for supplying a range of control pressures, said trim valve comprising:
   a valve body having a fluid inlet means, a fluid outlet means connected with the torque transmitter and a fluid exhaust means;
   a sleeve valve slidably disposed in said valve body comprising an inlet port alignable with said fluid inlet means, an outlet port alignable with said fluid outlet means, and an exhaust port alignable with said fluid outlet means;
   a spool valve slidably disposed in said sleeve valve and having spaced valve lands for selectively connecting said inlet port with said outlet port while closing said exhaust port and for selectively connecting said outlet port and said exhaust port while closing said inlet port;
   a first spring means for biasing said spool valve in one direction;
   a control chamber receiving the control pressure to urge said spool valve in another direction;
   second spring means having a plurality of spring rates for biasing said sleeve valve in said one direction;
   a pressure bias chamber in fluid communication with said fluid outlet means for urging said second spring means in said other direction; and
   said sleeve valve being moved in said other direction during a first portion of said control pressure range against the influence of a first portion of said spring rates and being moved in said other direction during a second portion of said control pressure range against the influence of a second portion of said spring rates.

2. The trim valve defined in claim 1 further comprising:
   said second spring means having a continuously varying spring rate during movement by the control pressure through both said first portion of the control pressure range and said second portion of the control pressure range.

3. The trim valve defined in claim 1 further comprising:
   means for limiting the movement of said sleeve valve in said other direction.

4. A trim valve in a fluid control system for controlling the apply pressure to a torque transmitter, said fluid control system having means for supplying a torque transmitter apply pressure and a range of control pressures, said trim valve comprising:
   a valve body having a bore, fluid inlet means for selectively receiving torque transmitter apply pressure, fluid outlet means for selectively delivering torque transmitter apply pressure, and fluid exhaust means;
   a sleeve valve slidably disposed in said valve bore for a range of linear movement and including an inlet port continually in fluid communication with said fluid inlet means, an outlet port continually in fluid communication with said fluid outlet means and an exhaust port continually in fluid communication with said fluid exhaust port;
   a first spring means having a variable rate for urging said sleeve valve toward a spring set position;
   a spool valve slidably disposed in said sleeve valve having a first land disposed to selectively control fluid flow from said inlet port to said outlet port and a second land, spaced from said first land and being disposed to selectively control fluid flow between said outlet port and said exhaust port when said first land is substantially closing said inlet port;
   a second spring means for urging said spool valve toward a spring set position;

control chamber means in fluid communication with the control pressure for supplying a control pressure bias to said spool valve to urge said spool valve against said second spring means; and feedback chamber means in fluid communication with said outlet means for applying a pressure bias to said sleeve valve to urge said sleeve valve against said first spring means to move said sleeve valve relative to said spool valve to control the opening and closing of said inlet port.

5. A trim valve in a fluid control system for controlling the apply pressure to a torque transmitter, said fluid control system having means for supplying a torque transmitter apply pressure and a range of control pressures, said trim valve comprising:

a valve body having a bore, fluid inlet means for selectively receiving torque transmitter apply pressure, fluid outlet means for selectively delivering torque transmitter apply pressure, and fluid exhaust means;

a sleeve valve slidably disposed in said valve bore for a range of linear movement and including an inlet port continually in fluid communication with said fluid inlet means, an outlet port continually in fluid communication with said fluid outlet means and an exhaust port continually in fluid communication with said fluid exhaust port;

a first spring means comprising an inner spring for continually urging said sleeve valve toward a spring set position and an outer spring disposed to engage said sleeve valve after a predetermined linear movement away from said spring set position;

a spool valve slidably disposed in said sleeve valve having a first land disposed to selectively control fluid flow from said inlet port to said outlet port and a second land, spaced from said first land and being disposed to selectively control fluid flow between said outlet port and said exhaust port when said first land is substantially closing said inlet port;

a second spring means for urging said spool valve toward a spring set position;

control chamber means in fluid communication with the control pressure for supplying a control pressure bias to said spool valve to urge said spool valve against said second spring means to open said inlet port in response to an increase in the control pressure; and feedback chamber means in fluid communication with said outlet means for applying a pressure bias to said sleeve valve to urge said sleeve valve against said inner spring to move said sleeve valve relative to said spool valve at a first gain rate during a first predetermined amount of linear movement of said sleeve valve and to urge said sleeve valve against both said inner spring and said outer spring to move said sleeve valve relative to said spool valve at a second gain rate during a second predetermined amount of linear movement of said sleeve valve to control the closing of said inlet port in response to an increase in torque transmitter apply pressure.

6. The trim valve defined in claim 5 further comprising:

a spring chamber housing said first and second spring means including an end wall abutting one end of each said first spring means said inner spring and said outer spring and an outer wall surrounding said second spring;

a first spring seat attached to said sleeve valve and abutting another end of said inner spring to retain said spring between said end wall and said sleeve valve; and a second spring seat attached to said outer wall and abutting another end of said second spring, said second spring seat having an inner portion aligned to abut said first spring seat after said first predetermined amount of linear movement of said sleeve valve.

* * * * *